(12) United States Patent
Van Arkel et al.

(10) Patent No.: US 6,224,315 B1
(45) Date of Patent: May 1, 2001

(54) METHOD AND APPARATUS FOR EMPTYING A CONTAINER FILLED WITH PRODUCTS

(75) Inventors: Jan Marinus Van Arkel, Tricht; Jan Van Der Vlist, Schoonhoven, both of (NL)

(73) Assignee: De Greef's Wagen- Carrosserie- en Machinebouw B.V. (NL)

( * ) Notice: Subject to any disclaimer, the term of this patent is extended or adjusted under 35 U.S.C. 154(b) by 0 days.

(21) Appl. No.: 09/214,321
(22) PCT Filed: Jul. 7, 1997
(86) PCT No.: PCT/NL97/00391
 § 371 Date: Sep. 10, 1999
 § 102(e) Date: Sep. 10, 1999
(87) PCT Pub. No.: WO98/01380
 PCT Pub. Date: Jan. 15, 1998

(30) Foreign Application Priority Data

Jul. 5, 1997 (NL) .................................................. 1003514

(51) Int. Cl.$^7$ .............................. B08B 9/24; B65G 49/00; B65G 65/23
(52) U.S. Cl. ........................... 414/403; 414/420; 414/421
(58) Field of Search .................................... 414/418, 419, 414/420, 421, 403

(56) References Cited

U.S. PATENT DOCUMENTS 2,894,516 7/1959 Froehlich ................ 134/62

FOREIGN PATENT DOCUMENTS

| 0167082 | 1/1986 | (EP) . |
| 0425331 | 5/1991 | (EP) . |
| 2661163 | 10/1991 | (FR) . |
| 2664566 | * 1/1992 | (FR) . |
| 2728231 | 6/1996 | (FR) . |

* cited by examiner

Primary Examiner—Steven A. Bratlie
(74) Attorney, Agent, or Firm—Webb Ziesenheim Logsdon Orkin & Hanson, P.C.

(57) ABSTRACT

The invention relates to a method for emptying a container filled with products such as agricultural or horticultural products by immersing the container in a basin filled with liquid, causing the products to flow out of the container and lifting the emptied container out of the basin, wherein the container is tilted in the basin and lifted out of the basin in a curved path. In this manner products which do not float, or hardly so, can be offloaded quickly and efficiently without danger of damage. The invention also relates to an apparatus for performing this method. Such an apparatus is provided according to the invention with a basin filled with liquid and means for immersing the filled container in the basin and lifting the container therefrom after offloading of the products, which immersing and lifting means are adapted to perform a combined tilting and translation movement along a curved path during offloading of the products.

15 Claims, 8 Drawing Sheets

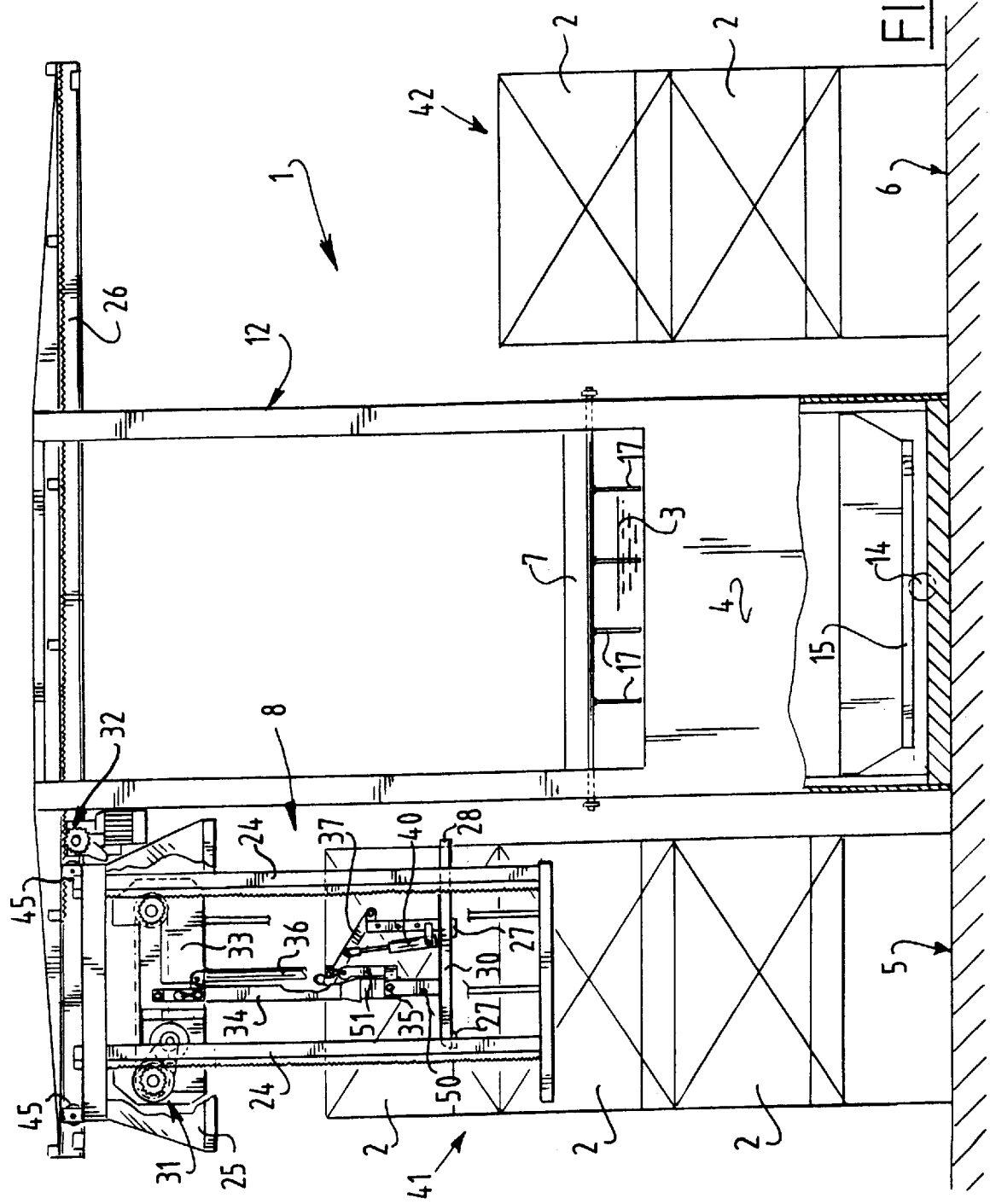

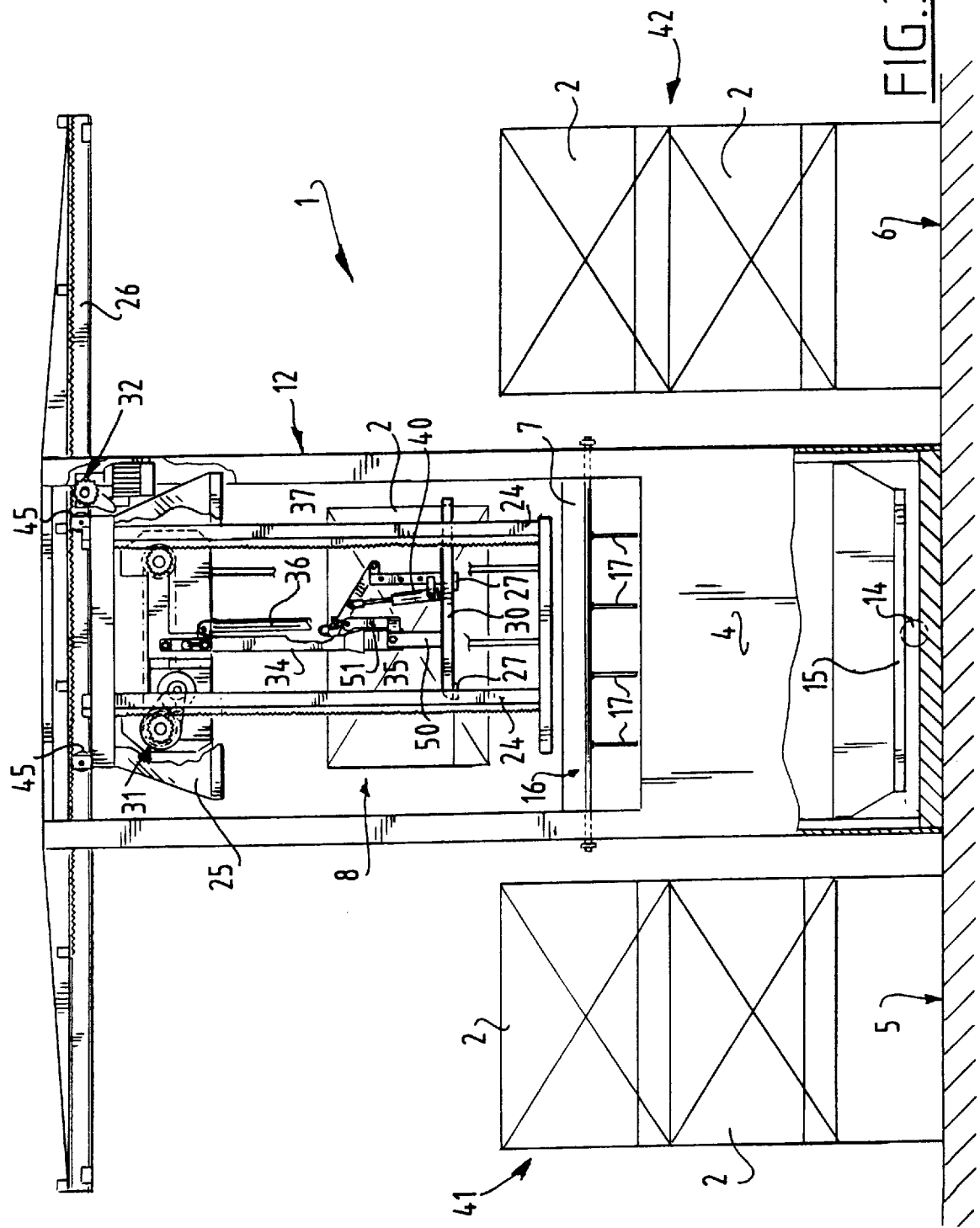

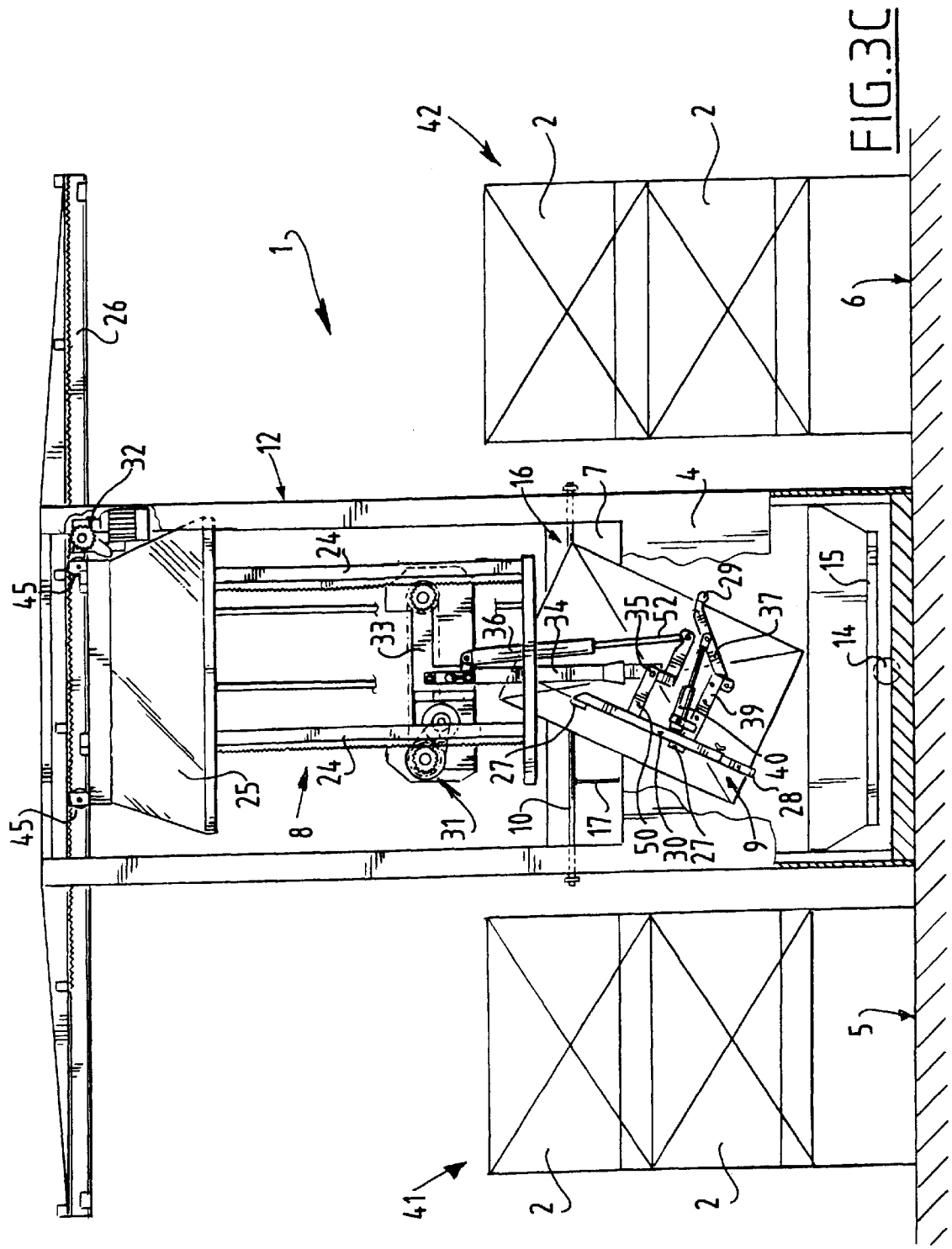

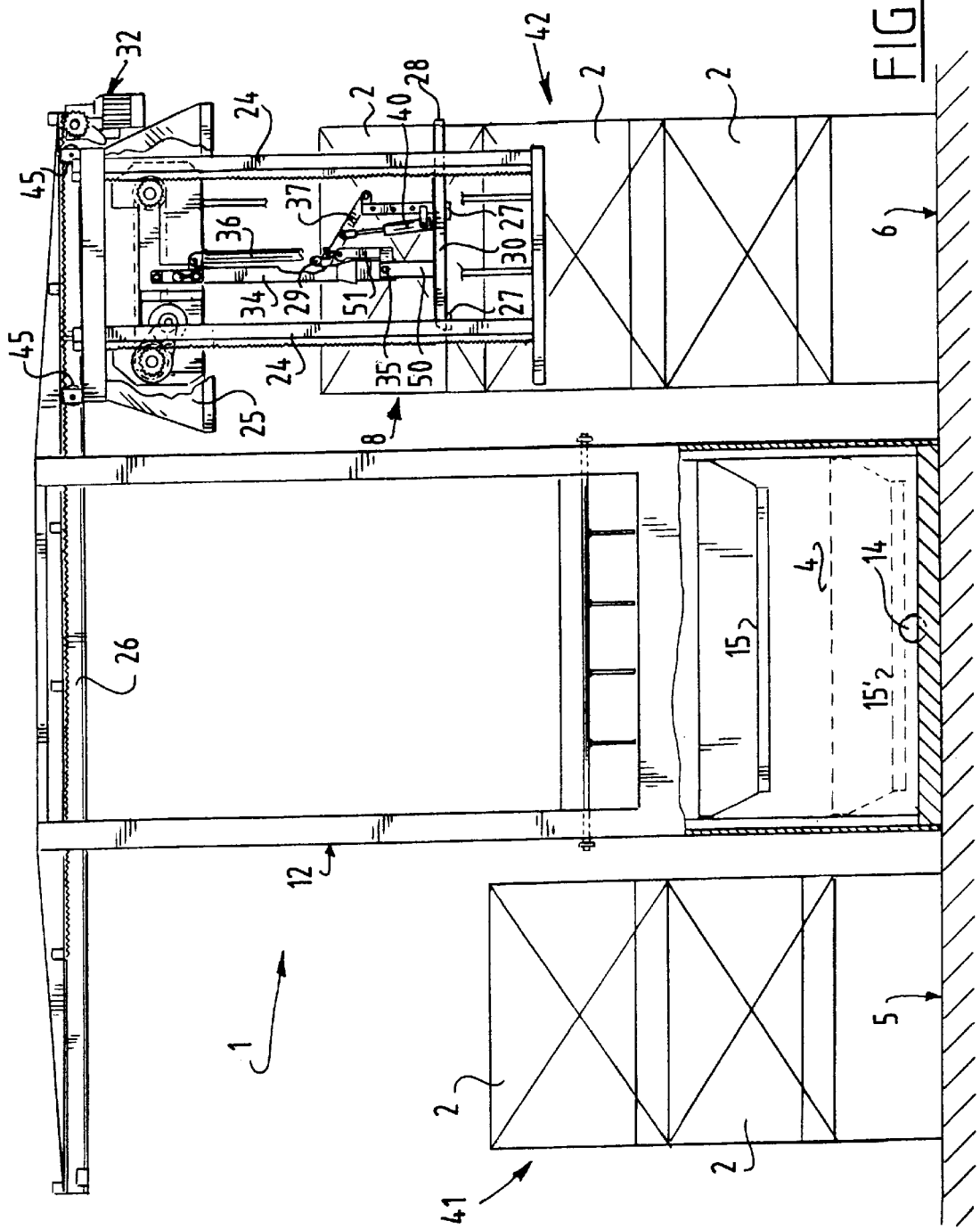

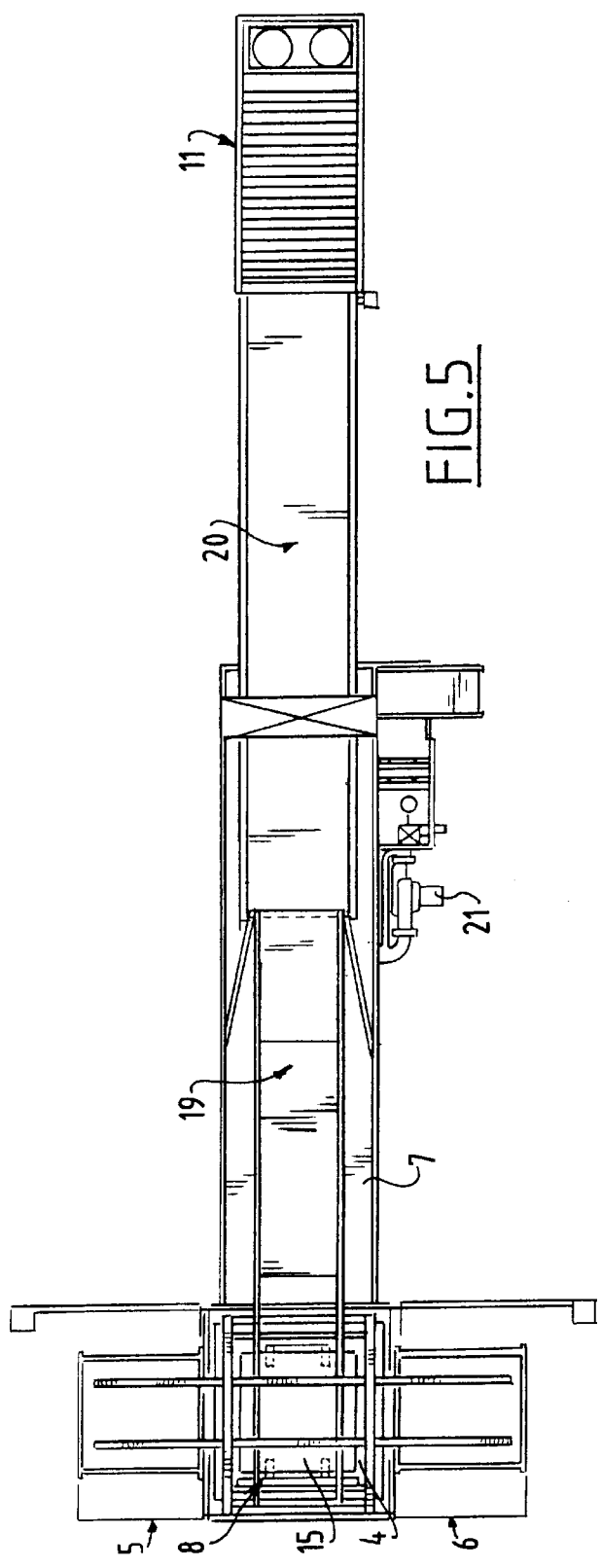
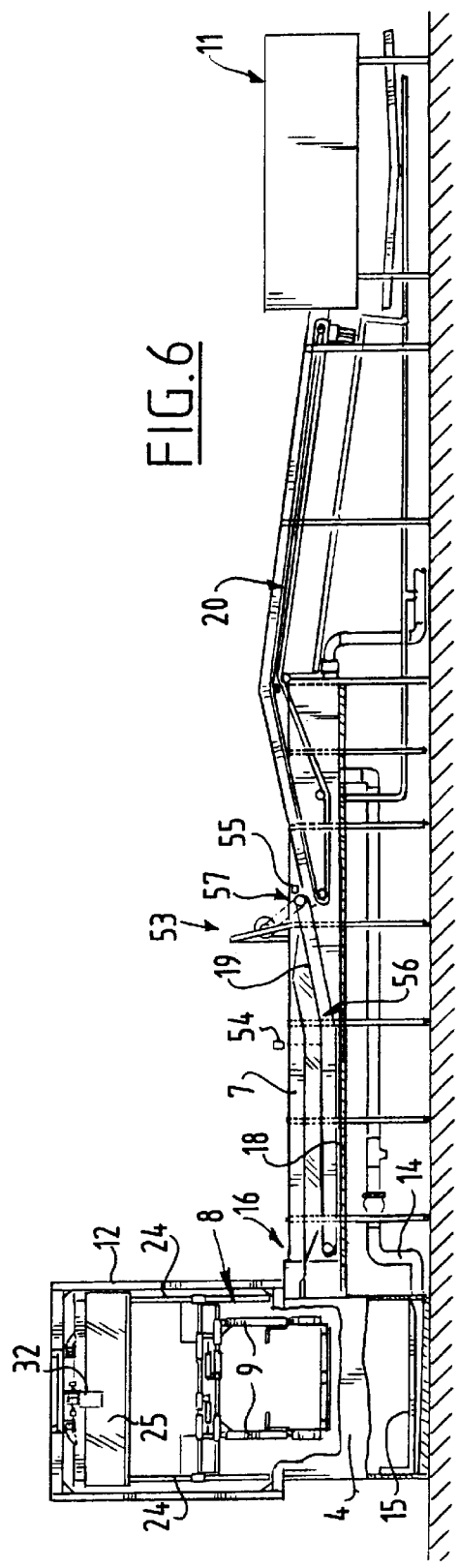

METHOD AND APPARATUS FOR EMPTYING A CONTAINER FILLED WITH PRODUCTS

BACKGROUND OF THE INVENTION

1. Field of the Invention

The invention relates to a method for emptying a container filled with products such as agricultural or horticultural products by immersing the container in a basin filled with liquid, causing the products to flow out of the container and lifting the emptied container out of the basin.

2. Description of the Prior Art

Such a method is known and is applied for instance to unload crates filled with horticultural products such as apples into a sorting device. The crate with apples is herein moved vertically downward into the basin filled with liquid, generally water, whereby the apples, which are lighter than water, will float out of the crate. A transport channel is herein generally connected onto the basin, while using pumps a water current is generated from the basin to the channel whereby the apples float out of the basin into the channel to the sorting device.

This known method has a number of drawbacks. It is for instance only suitable for emptying containers which are filled with products which float well in the chosen liquid. If this liquid is water the known method is certainly suitable for apples but not for instance for pears which have considerably less buoyancy in water. A solution herefor which is frequently used in practice is to adapt the properties of the liquid, for instance by adding agents thereto such as salt and the like. This has the drawback that the products themselves are often adversely affected by such additives. Particularly in the case of products intended for human consumption this is generally unacceptable. In addition, components which come into contact with the liquid, such as the basin, the channel and moving parts possibly present therein, are often also corroded by such additives. Another drawback of the known method is that it is relatively slow. It is necessary to wait until all products have floated up out of the container and been carried by the current from the basin to the channel before the container can be removed from the basin and a following container can be unloaded therein. This creates interruptions in the supply of the products to the sorting device.

SUMMARY OF THE INVENTION

The invention therefore has for its object to provide a method of the above described type wherein the above stated drawbacks do not occur. According to the invention this is achieved in that the container is tilted in the basin and lifted out of the basin in a curved path. By tilting the container in the container, whereby the products are removed therefrom irrespective of their buoyancy, a considerable acceleration of the method is obtained. Furthermore, the method hereby becomes suitable for products which do not float or hardly so, such as in the above cited example of pears. By causing the container to describe a curved path, whereby it is as it were pulled away from under the products, possible damage to the products is moreover minimized.

The invention also relates to an apparatus with which this method can be performed. The starting point here is an apparatus for emptying a container filled with products such as agricultural or horticultural products provided with a basin filled with liquid and means for immersing the filled container in the basin and lifting the container therefrom after offloading of the products which is generally known and made commercially available by applicant under the name "Water Dumper" or in more elaborate form as "ODS". The apparatus according to the invention is distinguished from this known apparatus in that the immersing and lifting means are adapted to perform a combined tilting and translation movement along a curved path during offloading of the products.

BRIEF DESCRIPTION OF THE DRAWINGS

This invention will now be elucidated on the basis of a number of embodiments, wherein reference is made to the annexed drawing, in which:

FIGS. 5 and 6 show a top view and a side view of the apparatus according to the invention in combination with a final processing line.

DESCRIPTION OF THE PREFERRED EMBODIMENTS

Figure 1:
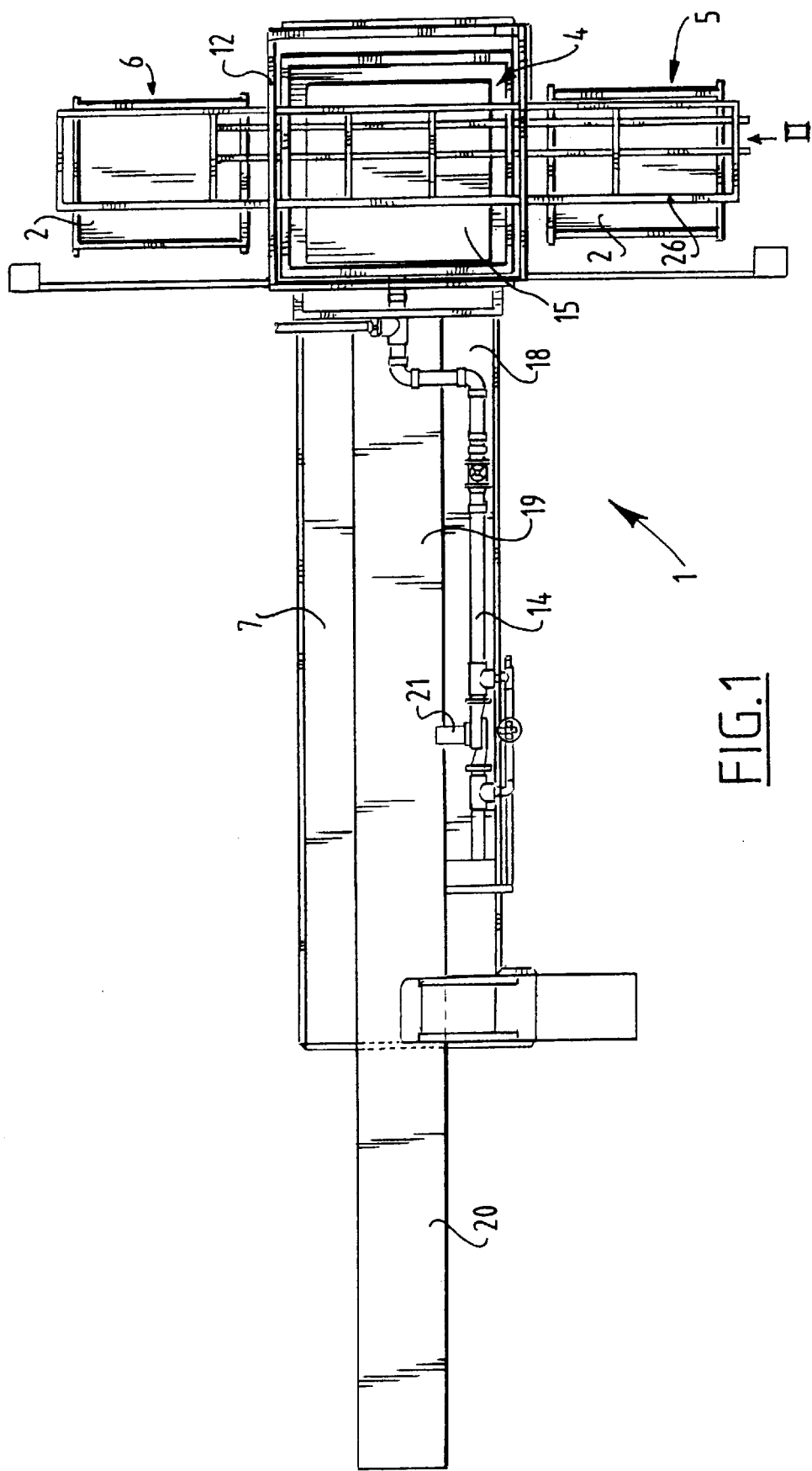
FIG. 1 shows a top view of a first embodiment of the apparatus according to the invention.

An apparatus 1 (FIG. 1) for emptying a container 2 filled with products such as agricultural or horticultural products is provided with a basin 4 filled with liquid 3, in addition to means 8 for immersing the filled container 2 in basin 4 and lifting container 2 therefrom after the products are offloaded. Situated on either side of basin 4 is a first location 5 and a second location 6, wherein the filled containers 2 are supplied at the first location 5 and the emptied containers 2 are discharged at the second location. The immersing and lifting means 8 comprise grippers 9 which co-act with openings 22 in the sides 23 of containers 2. These grippers 9 are mounted in a frame 12 placed above basin 4 and are displaceable in horizontal direction from the first location 5, where they pick up a filled container 2, to the basin 4, where they immerse and empty the container, and subsequently to the second location 6 where container 2 is once again set down.

The basin 4 is further connected to a channel 7 which is likewise filled with the liquid 3 and through which the products offloaded in the liquid 3 in basin 4 are further transported in this liquid 3 through the channel 7. For this purpose there is a return conduit 14 which connects the end of the transport channel 7 located furthest from basin 4 to the underside of basin 4. Arranged in this conduit is a pump 21 with which, when device 1 is in operation, a liquid current is generated through the return conduit from the end of transport channel 7 to basin 4 whereby a reverse current is thus generated in basin 4 and transport channel 7. Due to this current the offloaded products flow out of basin 4 to transport channel 7 and thereby to the end of the transport channel, where by means of for instance a belt conveyor 20 they can be removed from channel 7 and transferred to a (dry) sorting device 11 (FIGS. 5 and 6). Up to this point the apparatus 1 is substantially the same as the apparatuses made commercially available by applicant under the name "ODS".

Figure 2:
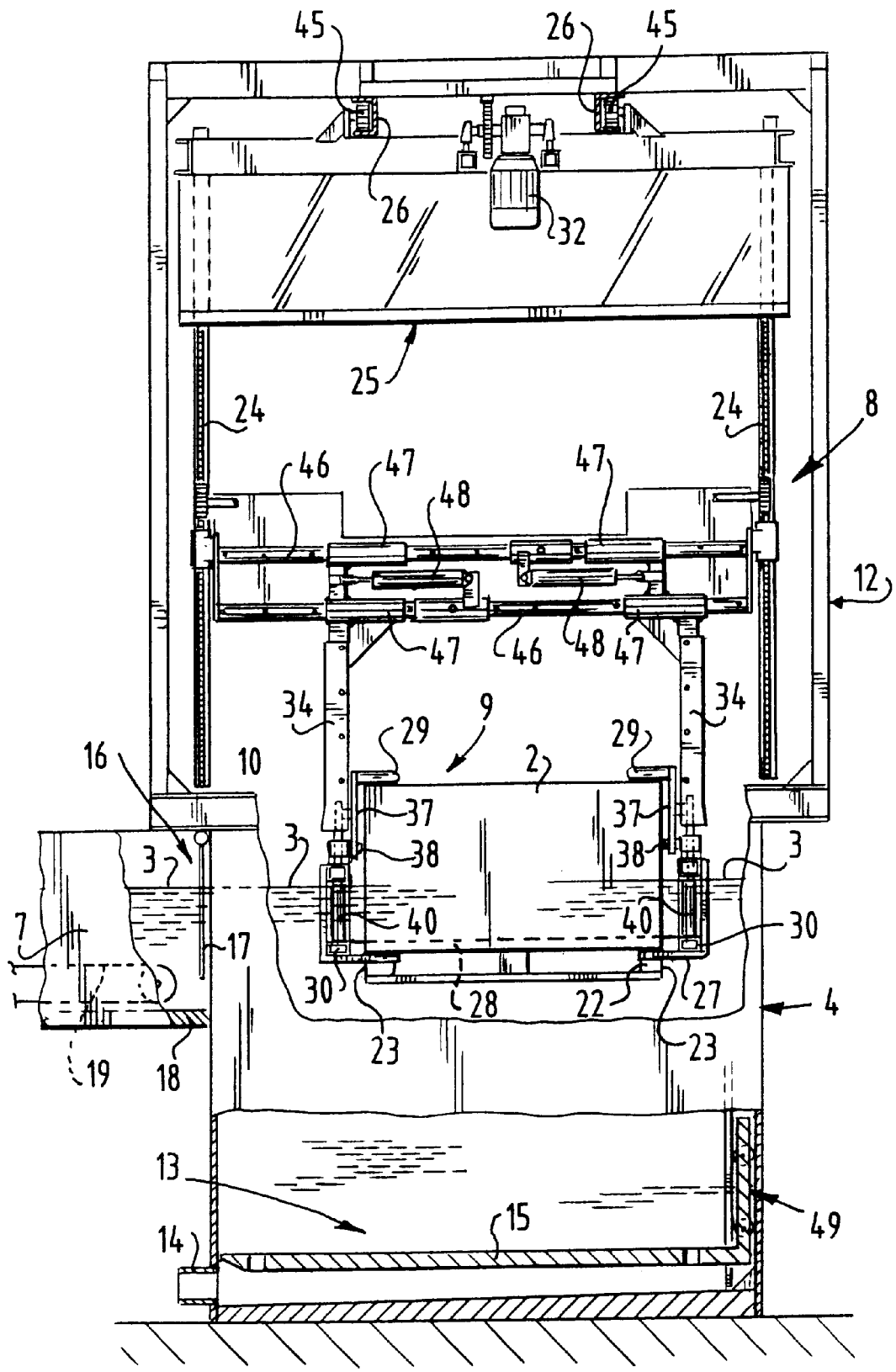
FIG. 2 is a side view of a part of the apparatus as according to arrow II in FIG. 1, FIGS. 3A–3D show in front view the different steps of emptying a container filled with products by applying the method according to the invention.

In order now to make this per se known apparatus 1 suitable for emptying containers 2 filled with products which float less well in the liquid 3 of basin 4, the immersing and lifting means 8 are adapted to perform a combined tilting and translation movement along a curved path when containers 2 are unloaded in basin 4. For this purpose the grippers 9 of immersing and lifting means 8 are pivotable on a horizontal axis and displaceable along a vertical axis. The displacement in vertical direction is provided by vertical guides 24 which form part of an auxiliary frame 25 (FIG. 2). This auxiliary frame 25 is in turn displaceable in horizontal direction by means of guide rollers 45 along guide rails 26 which are arranged at the top in frame 12 to carry containers 2 to and from basin 4. A drive unit 32 is present to move auxiliary frame 25.

The grippers 9 of immersing and lifting means 8 comprise carriers 30 for placing on either side of container 2, which carriers are provided with protruding teeth 27 which can be placed under container 2 or in openings 22 on the underside thereof. In addition, each carrier 30 is provided on one end with a stop 28 (FIG. 3) with which container 2 is held in place during the tilting movement. Finally, each gripper 9 further comprises a pressing element 29 which is displaceable relative to carrier 30 in order to fixedly clamp container 2 and which additionally functions as detection member, as will be elucidated hereinbelow. Pressing element 29 is arranged on an arm 37 which is pivotally connected via a hinge 38 to an upright 39 which is fixedly connected to carrier 30. Further arranged between pivot arm 37 and carrier 30 is a cylinder 40 with which pivot arm 37 can be pulled to carrier 30 and the pressing element 29 can thus be clamped fixedly onto the top part of container 2. Grippers 9 can be moved toward and away from each other so as to be able to pick up and again set down the containers. For this purpose the supports 34 are mounted for movement toward and away from each other on sleeves 47 which are suspended slidably on carriers 46 of auxiliary frame 25. For displacement of sleeves 47 and therewith the supports 34 toward and away from each other a cylinder 48 is arranged between each sleeve 47 and a fixed part of auxiliary frame 25.

Carrier 30 is suspended from a support 34 which in turn is suspended from a carriage 33 which is displaceable along the vertical guides 24 and provided with a drive unit 31. Support 34 is provided at predetermined height above carrier 30 with a hinge 35 which enables a tilting movement of carrier 30 and thereby of container 2. In order to tilt carrier 30 with container 2 clamped fixedly thereon, the part 50 of the supporting arm located under hinge 35 is connected to a control arm 51 which is connected in turn to a piston rod 52 of a tilting cylinder 36. At its top this tilting cylinder 36 is mounted hingedly on supporting arm 34. Control arm 51 is placed eccentrically in relation to supporting arm 34, whereby extending or retracting of piston rod 52 results in a tilting moment round hinge 35 whereby the carrier 30 with container 2 can thus be tilted or, conversely, set straight again. The placing of tilting cylinder 36 and control arm 51 relative to carrier 30 is herein chosen such that the axis of the tilting movement runs practically through the center of gravity of the container. Both tilting cylinder 36 and cylinder 40 of pressing element 29 are otherwise embodied as pneumatic cylinders due to the fact that they must operate in the liquid 3 in basin 4.

Although the above described immersing and lifting mechanism 8 already results in a considerable speed increase compared to the traditional water dumper, and therefore an increase in productivity, since container 2 can hereby be removed from basin 4 before all products have flowed out of the basin to channel 7, which was not the case with the traditional dumper, in the apparatus 1 as shown here means 13 are further present for transferring the offloaded products from basin 4 to transport channel 7. Due to such transferring means 13 the apparatus 1 also becomes suitable for offloading products which have relatively little buoyancy in the chosen liquid 3. When liquid 3 is normally water, this could apply to fruits such as pears which, depending on type and harvesting season, will be suspended rather than float in water. Transferring means 13 comprise a lifting platform 15 which is displaceable in height direction in basin 4. This lifting platform is mounted on one side of basin 4 in schematically shown guide means 49 and is driven via a stainless steel chain arranged behind a partition in basin 4 by a drive unit (not shown) arranged outside basin 4. By raising the lifting platform 15 which in principle rests on the bottom of basin 4 during emptying of container 2, the offloaded products are urged out of basin 4 to channel 7. A conveyor 19 can also be arranged in channel 7 in the vicinity of its bottom 18 for transporting through channel 7 those products which rest and are suspended on or in the vicinity of the bottom 18 of channel 7. Instead of a vertically displaceable lifting member 15 it is of course also possible to make use of an inclining conveyor arranged in basin 4 and connecting onto conveyor 19 of channel 7.

In order on the one hand to prevent blockage of channel 7 due to an accumulation of products, whereby damage to the products could easily occur, and on the other to ensure a uniform discharge from channel 7 and therefore a uniform supply of products to sorting device 11, the apparatus further comprises means 16, 53 with which the quantity of products present in transport channel 7 can be detected. In the embodiment shown the detecting means 16 are formed by switching elements or vanes 17 protruding into the channel 7 and displaceable by the products. These switching elements or vanes 17, which are pivotable round a shaft 10, can be connected to a warning means such as a bell or a lamp with which the user can be alerted that blockage of channel 7 is imminent, but it is also possible to include the warning means 16 in a control system for the whole apparatus 1. Such a control system could control the movements of the immersing and lifting means 8 and of transferring means 13. In the embodiment shown the switching elements 17 are otherwise arranged at the position of the transition between basin 4 and transport channel 7 and protrude into liquid 3 to a point close to the bottom 18 of transport channel 7. Switching elements 17 are adapted such that when there is a normal supply of products from basin 4 to channel 7 they in fact canalize the flow thereof, but when the supply is too great they are pressed aside by the products and pivoted on their shaft 10 whereby a warning or control signal is generated. Switching elements 17 can therein operate mechanical switches but it is also possible in order to generate a warning or control signal for use to be made for instance of the interruption of a light beam by a switching element 17.

In the embodiment shown the detecting means 53 do indeed take the form of opto-electric elements, for instance light cells 54, 55, with which the presence of products in channel 7 or at the end of conveyor 19 is detected. Light cell 54 is herein arranged practically halfway along conveyor 19 and directed vertically and thus detects the presence of products in the water of channel 7. Because the products will be relatively evenly distributed in the width direction of the channel, inter alia as a result of the turbulence in channel 7, a representative image of the loading of the whole channel 7 can be obtained with a single light cell 54. This latter is particularly intended to regulate the operating speed of apparatus 1. When no products are detected in channel 7 for some time this is an indication that all products coming from an unloaded container 2 have passed the light cell 54 and it is therefore time to unload a following container 2 in the basin 4 in order to continue providing the further processing line with an uninterrupted flow of products.

The light cell 55 at the end 57 of conveyor 19 is directed horizontally and thus covers the width of channel 7. This light cell 55 detects the presence of products as the position of the transition between conveyor 19 and the subsequent belt conveyor 20 with which the products are taken out of channel 7 and fed to the drying and sorting device 11. The transition itself takes place under water in order to prevent damage to the products as far as possible, but the detection must take place above water to obtain reliable results. Conveyor 19 has for this purpose a bend 56. On the basis of the detection by light cell 55 the speed of conveyor 19 can be controlled such that the products can be supplied one by one to the following processing line. Thus, when too many products pass light cell 55 all at once or within a short space of time, the conveyor 19 is halted temporarily. Conversely, when the time interval between successive detections becomes too long the conveyor 19 is accelerated. In the shown embodiment conveyor 19 has four speeds for this purpose.

The operation of apparatus 1 is as follows. A container 2 filled with products or a stack 41 of such containers is supplied to the first location 5 where the or each container 2 is picked up by the immersing and lifting means 8. For this purpose the grippers 9 are first adapted to the detected height of the container(s) 2 for picking up by adjusting a suitable vertical distance between pressing elements 29 and the teeth 27 of gripper 9. Auxiliary frame 25 is then moved along guide rails 26 to a position above the first location 5, whereafter grippers 9 are brought downward along the vertical guides 24 until pressing elements 29 contact the upper edge of the uppermost container 2. Pressing elements 29 are thus moved slightly upward relative to gripper 9 whereby a switch is actuated and the vertical movement of gripper 9 is interrupted. Pressing elements 29 thus also function as detectors of the container(s) 2 to be picked up, so that no separate detection system need be present for that purpose. By actuating cylinders 48 the grippers 9 are subsequently moved toward each other whereby their teeth 27 engage on the underside of container 2 and the cylinders 40 connected to pressing elements 29 are energized whereby pressing elements 29 are pressed with force onto the upper edge of container 2. Container 2 is hereby completely fixed between grippers 9 (FIG. 3A).

Container 2 is subsequently moved upward and displaced to a position above basin 4 (FIG. 3B). The grippers 9 are then moved downward with the container 2 into the basin and there tilted by operating cylinder 36 and simultaneously moved upward by displacing the whole carriage 33 along guides 24. Container 2 thus describes a curved path, whereby the products can roll out of it and float with a minimal risk of damage thereto. Container 2 is in fact herein pulled out from under the products (FIG. 3C). Once the grippers 9 have returned above the liquid surface in the basin they are pivoted back to a horizontal position, whereafter the emptied container 2 is set down at a second location 6 on a stack 42 formed or to be formed there (FIG. 3D). Auxiliary frame 25 can then be moved again to the first location 5 to pick up a following container 2. In the meantime, if the offloaded products do not float in the liquid or hardly so, the transferring means 13 can be switched on to carry offloaded products to channel 7. This can take place by stepwise raising of the lifting member 15 under the control of detection means 16. Containers 2 are otherwise picked up, emptied and set down again in a continuous movement without being transferred at any moment. The operating speed of the apparatus is hereby increased, while the risk of damage to containers 2 and the products present therein as a result for instance of the containers not being properly transferred is minimized.

The apparatus 1 can operate fully autonomously under the control of a control system. The user can herein enter for instance the type of products, whereafter the dimensions of the container are detected by pressing elements 29 and the type and quantity of supplied products are thus known. Subject thereto the transferring means 13 respectively 19 can optionally be switched on by the control system, the operating speed of which means is again regulated by detecting means 16 respectively 53. These detecting means 16, 53 can also be used to indicate when a following container 2 can be unloaded in basin 4.

It is however also possible in a simpler embodiment to operate the apparatus manually. The first and second location 5 and 6 can for instance be omitted herein and frame 12 can be embodied very simply. Using for instance a forklift truck the containers 2 can be carried into the vicinity of the grippers which then take over container 2 and are then carried downward into basin 4 under manual control and there tilted and moved upward again. The rotational movements using the tilting cylinder 36 and the translation movement along the vertical guides 24 can herein be adjusted to each other by the user such that container 2 is again pulled out from under the products along a curved path. Such a simple, hand-operated embodiment is for instance suitable for applications wherein it is always small numbers of containers 2 which have to be emptied.

Figure 4:
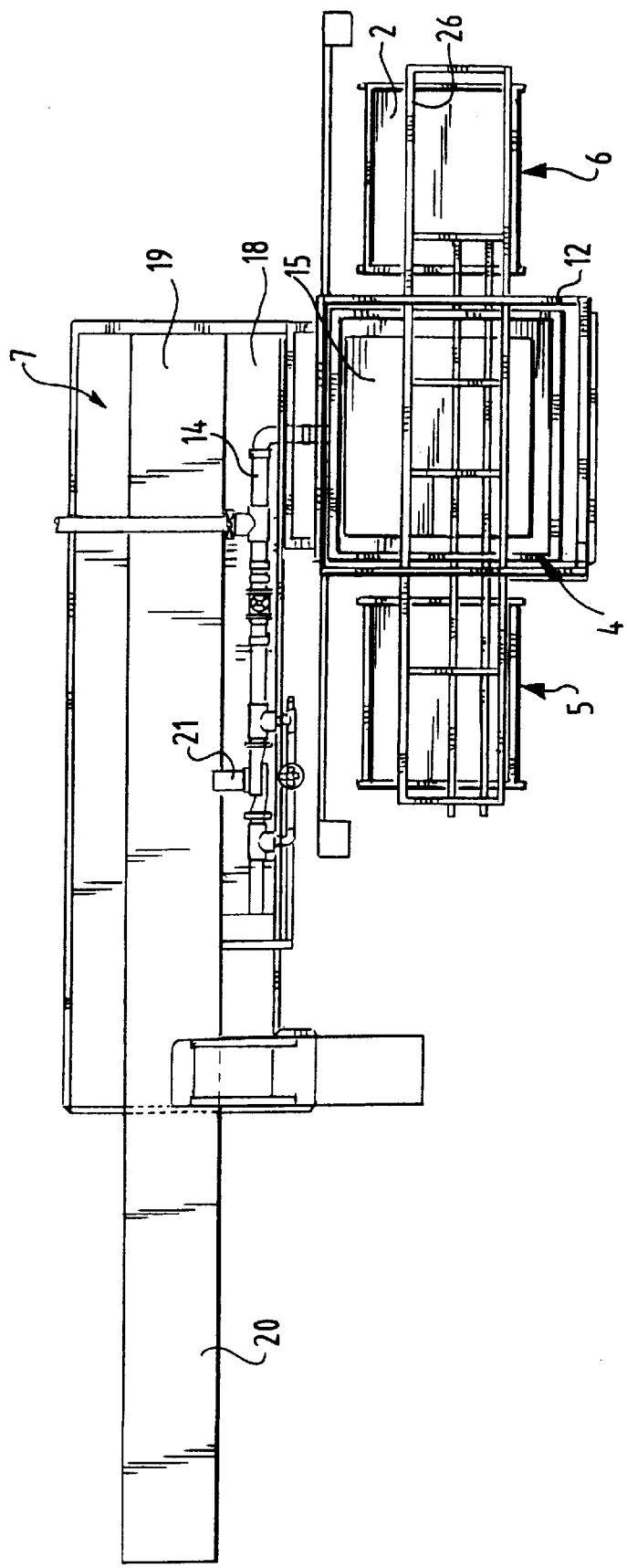
FIG. 4 is a top view of an alternative embodiment of the apparatus according to the invention.

Although in the foregoing an apparatus 1 is described and shown wherein transport channel 7 lies in line with basin 4, this is not essential. If preferred from considerations of space, channel 7 can for instance also be placed transversely of basin 4 (FIG. 4) or describe a bend.

Nor is it essential that, as in the shown embodiment, the supply and discharge direction of containers 2 lie transversely of the discharge direction of the offloaded products. If deemed desirable in respect of the discharge speed of the products out of basin 4, it would also be possible to choose an axis of the tilting movement of grippers 9 and container 2 transversely of the discharge direction. The products would then be able to flow directly into channel 7 during tilting of containers 2. For this purpose the auxiliary frame 25 for instance could be pivotable on a vertical shaft whereby grippers 9 with the containers 2 therebetween could be rotated through an angle of 90° between the moment the container 2 is picked up and the moment of tilting thereof. After tilting they could be rotated back again through 90° before the emptied container 2 is set down. It is also possible to choose the first location 5 in line with channel 7 and the second location 6 above the channel so that the supply of containers 2, unloading thereof by tilting in basin 4 and the discharge all take place in the same direction.

Finally, the control of apparatus 1, and particularly of conveyor 19 in discharge channel 7, is not limited to use in combination with the tiltable immersing and lifting mechanism but it could also be applied in a conventional unloading apparatus such as the above discussed "ODS" while still retaining the associated advantages.

The apparatus as described above enables rapid and simple unloading of containers filled with products, particularly agricultural and horticultural products such as apples, pears or tomatoes, in a basin filled with liquid, whereby the danger of damage to the produce is minimized. Furthermore, with the use of the transferring means as described above this unloading method can also be applied in the case of products having little or no buoyancy in the chosen liquid.

What is claimed is:

1. An apparatus for emptying a container having an open top side and filled with products such as agricultural or horticultural products, said apparatus comprising a basin filled with liquid and means for gripping the filled container, means for immersing it in the basin and means for lifting the container therefrom after offloading of the products, wherein the immersing and lifting means are adapted to perform a combined tilting and translation movement for moving at least the open side of the container along a curved path within the basin during offloading of the products.

2. The apparatus as claimed in claim 1, wherein the immersing and lifting means have grippers which co-act with the container and which are mounted in a frame placed above the basin for pivoting on a lying axis and for displacement along a standing axis.

3. The apparatus as claimed in claim 2, wherein the grippers are displaceable in horizontal direction relative to the basin and are adapted to pick up at a first location the container for emptying and to set down the emptied container at a second location.

4. The apparatus as claimed in claim 1, further including programmable control means connected to the immersing and lifting means.

5. The apparatus as claimed in claim 1, further including means for transferring the offloaded products from the basin to a transport channel filled with the liquid.

6. The apparatus as claimed in claim 5, further including means connected controllably to the transferring means for detecting the quantity of products present in the transport channel.

7. The apparatus as claimed in claim 6, wherein the detection means includes switching elements protruding into the transport channel and displaceable by the products.

8. The apparatus as claimed in claim 6, wherein the detection means includes at least one opto-electric element arranged close to the transport channel.

9. The apparatus as claimed in claim 5, wherein the transferring means includes a lifting member arranged in the basin and displaceable therein in height direction.

10. The apparatus as claimed in claim 5, wherein the transferring means includes an endless conveyor connecting the basin to the transport channel and arranged close to the bottom thereof.

11. The apparatus as claimed in claim 10, wherein the transporting speed of the conveyor is adjustable in response to the quantity of products in the transport channel detected by the detection means.

12. A method for emptying a container having an open top side and filled with products such as agricultural or horticultural products, said method comprising the steps of: mechanically immersing the container in a basin filled with liquid, causing the products to flow out of the container, and mechanically lifting the emptied container out of the basin, wherein the container is mechanically held and tilted in the basin and mechanically lifted out of the basin such that at least the open side of the container describes a curved path.

13. The method as claimed in claim 12, wherein the curve of the path is chosen subject to the type and dimensions of the products.

14. The method as claimed in claim 12, wherein the containers for emptying are picked up at a first location, transported to the basin, emptied in the basin, transported to a second location and there set down in a continuous movement.

15. The method as claimed in claim 12, wherein the offload products are carried by mechanical means from the basin to a transport channel connecting thereto.

* * * * *

UNITED STATES PATENT AND TRADEMARK OFFICE
CERTIFICATE OF CORRECTION

PATENT NO. : 6,224,315 B1  Page 1 of 1
DATED : May 1, 2001
INVENTOR(S) : Jan Marinus Van Arkel et al.

It is certified that error appears in the above-identified patent and that said Letters Patent is hereby corrected as shown below:

Column 1,
Line 10, "by immersing" should read -- by mechanically immersing --.
Line 12, "and lifting" should read -- and mechanically lifting --.
Line 14, after "Such a method is known" insert -- from EP-A-0 425 331 --.
Line 19, "A transport channel" should read -- Although not mentioned in this prior art docuemtent a transport channel --.
Lines 52-53, "container is tilted in the basin and lifted out of the basin" should read -- container is mechanically held and tilted within the basin and mechanically lifted --.
Line 54, "the container, whereby" should read -- the basin, whereby --.

Column 1, Line 62 through Column 2 Line 8,
Delete entire paragraph and replace with:

--It should be noted that US-A-2 897 516 describes a method for emptying a box filled with fruit wherein the box is arranged on a pallet which is lifted over a basin by a forklift. The box is subsequently tilted by rotating the forks of the forklift, and will fall into the basin, throwing clear the fruit. Boxes which are not tilted and emptied during the fall are retrieved from the basin and tilted at the end of a conveyor belt outside the basin. This document therefore does not relate a controlled tilting movement under water.

The invention also relates to an apparatus with which this method can be performed. The above-mentioned prior art document EP-A-0 425 331 already discloses an apparatus for emptying a container filled with products such as agricultural or horticultural products that is provided with a basin filled with liquid and means for gripping the filled container, immersing it in the basin and lifting the container therefrom after offloading of the products. The apparatus according to the invention is distinguished from this known apparatus in that the immersing and lifting means are adapted to perform a combined tilting and translation movement along a curved path within the basin during offloading of the products.--

Signed and Sealed this

Fifth Day of August, 2003

JAMES E. ROGAN
*Director of the United States Patent and Trademark Office*